(12) United States Patent
Kim et al.

(10) Patent No.: US 12,189,475 B2
(45) Date of Patent: Jan. 7, 2025

(54) STORAGE DEVICE FOR PROVIDING EVENT DATA AND OPERATION METHOD OF STORAGE DEVICE

(71) Applicant: SAMSUNG ELECTRONICS CO., LTD., Suwon-si (KR)

(72) Inventors: Jihong Kim, Suwon-si (KR); Yongkoo Jeong, Suwon-si (KR); Jooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 18/195,607

(22) Filed: May 10, 2023

(65) Prior Publication Data
US 2024/0134745 A1 Apr. 25, 2024
US 2024/0232010 A9 Jul. 11, 2024

(30) Foreign Application Priority Data
Oct. 19, 2022 (KR) .................. 10-2022-0135166

(51) Int. Cl.
| | | |
|---|---|---|
| G06F 11/10 | (2006.01) | |
| G06F 11/07 | (2006.01) | |
| G06F 11/30 | (2006.01) | |
| G06F 13/16 | (2006.01) | |
| G06F 13/28 | (2006.01) | |

(52) U.S. Cl.
CPC ...... *G06F 11/1068* (2013.01); *G06F 11/0772* (2013.01); *G06F 11/0784* (2013.01)

(58) Field of Classification Search
CPC ............ G06F 11/1068; G06F 11/0772; G06F 11/0784
See application file for complete search history.

(56) References Cited

U.S. PATENT DOCUMENTS

| | | |
|---|---|---|
| 9,047,922 B2 | 6/2015 | Higley et al. |
| 9,880,781 B2* | 1/2018 | Oh ........................ G11C 7/1045 |
| 11,048,581 B2 | 6/2021 | Sinha et al. |
| 11,294,743 B2 | 4/2022 | Konan et al. |
| 11,334,280 B2 | 5/2022 | Navon et al. |
| 11,347,573 B2 | 5/2022 | Kataria et al. |
| 2011/0066837 A1* | 3/2011 | Lee ........................ G06F 9/4401 710/22 |
| 2021/0303213 A1 | 9/2021 | Kato |
| 2022/0066683 A1 | 3/2022 | Elyasi et al. |
| 2022/0374171 A1* | 11/2022 | Jeong ................... G06F 3/0679 |

\* cited by examiner

*Primary Examiner* — Guy J Lamarre
(74) *Attorney, Agent, or Firm* — Sughrue Mion, PLLC

(57) ABSTRACT

A storage device includes a non-volatile memory device that includes memory blocks each including one or more memory cells, a combo integrated circuit (IC) that includes a temperature sensor and a memory, and a controller that is connected with the combo IC through first channels and controls the non-volatile memory device to write or read data in or from selected memory cells. When the controller determines that a first event occurs based on temperature data read from the combo IC, the controller records first event data in the memory of the combo IC. In a first operation mode, the combo IC outputs the first event data to the controller through the first channels. In a second operation mode, under control of an external host, the combo IC outputs the first event data to the external host through second channels different from the first channels.

20 Claims, 11 Drawing Sheets

FIG. 8

| EDR | | Data | Start | End | Size |
|---|---|---|---|---|---|
| EDR | EDR[0] | Time Tick | 0x000 | 0x003 | 4B |
| | | Temp Debug Log | 0x004 | 0x023 | 32B |
| | | PMIC Debug Log | 0x024 | 0x043 | 32B |
| | | SFR Reg Value | 0x044 | 0x07F | 60B |
| | EDR[1] | Time Tick | 0x080 | 0x083 | 4B |
| | | Temp Debug Log | 0x084 | 0x0A3 | 32B |
| | | PMIC Debug Log | 0x0A4 | 0x0C3 | 32B |
| | | SFR Reg Value | 0x0C4 | 0x0FF | 60B |
| | EDR[2] | Time Tick | 0x100 | 0x103 | 4B |
| | | Temp Debug Log | 0x104 | 0x123 | 32B |
| | | PMIC Debug Log | 0x124 | 0x143 | 32B |
| | | SFR Reg Value | 0x144 | 0x17F | 60B |
| | EDR[3] | Time Tick | 0x180 | 0x183 | 4B |
| | | Temp Debug Log | 0x184 | 0x1A3 | 32B |
| | | PMIC Debug Log | 0x1A4 | 0x1C3 | 32B |
| | | SFR Reg Value | 0x1C4 | 0x1FF | 60B |

STORAGE DEVICE FOR PROVIDING EVENT DATA AND OPERATION METHOD OF STORAGE DEVICE

CROSS-REFERENCE TO RELATED APPLICATION

This application claims priority under 35 U.S.C. § 119 to Korean Patent Application No. 10-2022-0135166 filed on Oct. 19, 2022, in the Korean Intellectual Property Office, the disclosure of which is incorporated by reference herein in its entirety.

BACKGROUND

Some embodiments described herein relate to a semiconductor device, and more particularly, relate to a storage device providing event data and an operation method of the storage device.

As semiconductor manufacturing technologies develop, the high integration of a storage device continues to progress. Due to the high integration of the storage device, various events such as an increase in a temperature, an increase in power consumption, and communication bottleneck have been discovered. The storage device may automatically perform a debugging operation by recording various events found as event data and reading the recorded event data.

However, when failing to recognize an external host or when an electrical over stress (EOS) issue occurs inside the device, the storage device may fail to perform the debugging operation based on the event data. In this case, the event data stored in the storage device may be incapable of being accurately read, thereby causing the reduction of reliability of the storage device.

SUMMARY

It is an aspect to provide a storage device providing event data through channels connecting an external host and the storage device under control of the external host and an operation method of the storage device.

According to an aspect of one or more embodiments, a storage device may include a non-volatile memory device including a plurality of memory blocks, each including one or more memory cells; a combo integrated circuit (IC) including a memory, and a temperature sensor that generates temperature data; and a controller connected with the combo IC through a plurality of first channels, the controller configured to control the non-volatile memory device to write data in or to read data from one or more selected memory cells of a memory block selected from the plurality of memory blocks, wherein, when the controller determines that a first event occurs based on the temperature data that is read from the combo IC, the controller records first event data in the memory of the combo IC, wherein, in a first operation mode, the combo IC outputs the first event data to the controller through the plurality of first channels based on a first command and an address received from the controller, and wherein, in a second operation mode, under control of an external host, the combo IC outputs the first event data to the external host through a plurality of second channels that are different from the plurality of first channels, based on a second command and the address received from the external host.

According to another aspect of one or more embodiments, there is provided an operation method of a storage device which includes a combo integrated circuit (IC) and a controller connected with the combo IC by a plurality of first channels. The operation method may include determining, by the controller, whether a first event occurs, based on temperature data that is read from the combo IC; when the first event occurs, recording, by the controller, first event data in a memory of the combo IC; in a first operation mode, outputting, by the combo IC, the first event data to the controller through the plurality of first channels based on a first command and an address received from the controller; and in a second operation mode, under control of an external host, outputting, by the combo IC, the first event data to the external host through a plurality of second channels different from the plurality of first channels, based on a second command and the address received from the external host.

According to yet another aspect of one or more embodiments, there is provided an operation method of a storage device which includes a combo integrated circuit (IC) and a controller connected with the combo IC by a plurality of first channels. The operation method may include determining, by the controller, whether a first event occurs, based on temperature data read from the combo IC; determining, by the controller, whether a second event occurs, based on overvoltage protection data or overcurrent protection data received from a power management integrated circuit; determining, by the controller, whether a third event occurs, based on an error correction fail code (UFCC) generated by an ECC block; when at least one event among the first event, the second event, or the third event occurs, recording, by the controller, at least one event data corresponding to the at least one event in a memory of the combo IC; in a first operation mode, outputting, by the combo IC, the at least one event data to the controller through the plurality of first channels based on a first command and an address received from the controller; and in a second operation mode, under control of an external host, outputting, by the combo IC, the at least one event data to the external host through a plurality of second channels different from the plurality of first channels, based on a second command and the address received from the external host.

BRIEF DESCRIPTION OF THE FIGURES

The above and other aspects will become apparent by describing in detail various embodiments thereof with reference to the accompanying drawings, in which:

FIG. 8 is a table illustrating data included in a plurality of data groups of FIG. 7 in detail;

DETAILED DESCRIPTION

Below, various embodiments will be described in detail and clearly to such an extent that one of ordinary skill in the art may easily implement the embodiments. As used in this specification, the phrase "at least one of A and B" includes within its scope "only A", "only B", and "A and B".

Figure 1:
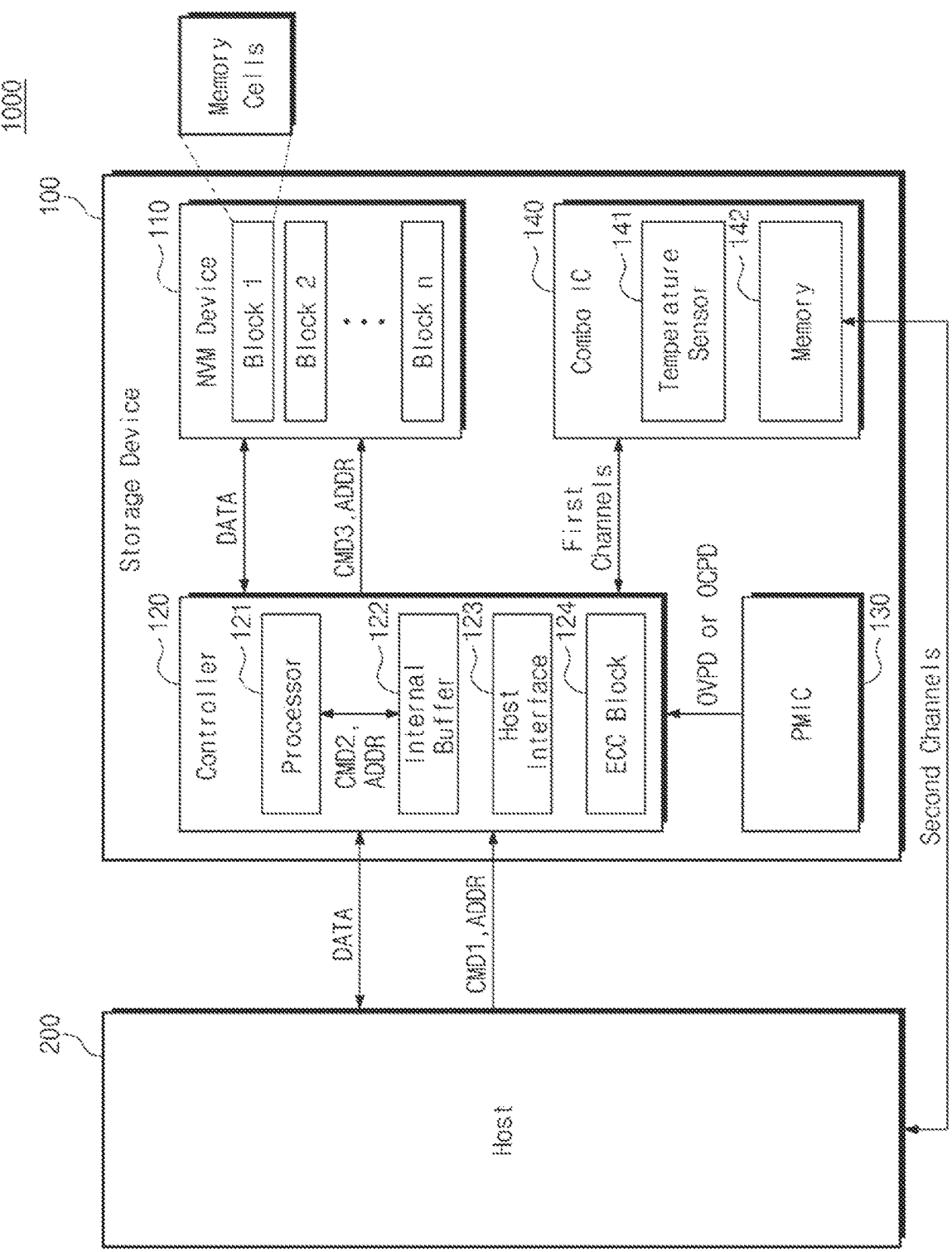
FIG. 1 is a diagram illustrating an electronic device including a storage device according to some embodiments.

FIG. 1 is a diagram illustrating an electronic device 1000 including a storage device 100 according to some embodiments. Referring to FIG. 1, the electronic device 1000 for performing the read operation for event data may include the storage device 100 and an external host 200 that is external to the storage device 100.

The storage device 100 may include a plurality of storage devices. However, in this specification, only the storage device 100 being one of the plurality of storage devices will be described. Configurations and functions of the remaining storage devices may be the same as a configuration and a function of the storage device 100 to be described below.

The storage device 100 may include a device, which stores data on a magnetic disk, such as a hard disk drive (HDD), or a device, which stores data on a semiconductor memory device, in particular, a non-volatile memory device, such as a solid state drive (SSD) or a memory card. Below, various embodiments will be described under the condition that the storage device 100 is the solid state drive (SSD).

The storage device 100 may include a non-volatile memory device (hereinafter referred to as an "NVM device") 110, a controller 120, a power management integrated circuit (hereinafter referred to as a "PMIC") 130, and a combo IC 140.

The NVM device 110 includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), or a ferroelectric RAM (FRAM).

The NVM device 110 may include a plurality of memory blocks. Each of the plurality of memory blocks may include a plurality of memory cells. Each of the plurality of memory cells may store two or more bits.

The controller 120 may receive various commands from the external host 200 for writing data in the NVM device 110 or reading data from the NVM device 110, and the controller 120 may control the NVM device 110.

The controller 120 may access the NVM device 110 through a plurality of communication lines. For example, the controller 120 may send a command and an address to the NVM device 110 through the plurality of communication lines.

The controller 120 may selectively access one memory block among the plurality of memory blocks included in the NVM device 110 through the plurality of communication lines based on the command and the address received from the external host 200.

In this case, the controller 120 may exchange data with the NVM device 110 through the write and read operations for memory cells selected from memory cells of the selected memory block.

The controller 120 may include a processor 121, an internal buffer 122, a host interface 123, and an error correcting code (ECC) block 124.

The processor 121 may execute an operating system or firmware for driving the controller 120. The processor 121 may receive a first command CMD1 from the external host 200 and may parse the first command CMD1. The processor 121 may parse the first command CMD1 to generate a second command CMD2 and may store the second command CMD2 in the internal buffer 122.

The internal buffer 122 may include a random access memory. For example, the internal buffer 122 may include a static random access memory or a dynamic random access memory.

The processor 121 may receive the second command CMD2 stored in the internal buffer 122 and may generate a third command CMD3 for controlling the NVM device 110. The processor 121 may control the NVM device 110 based on the third command CMD3 and an address ADDR.

The processor 121 may store data for determining whether an event occurs in the controller 120 in the internal buffer 122. The data for determining whether the event occurs may include temperature information for entering a critical mode or a blocking mode of the storage device 100 and information for processing error-related information generated in the storage device 100.

The host interface 123 may receive a command and an address from the external host 200. The host interface 123 may store the receive command and address in the internal buffer 122. The host interface 123 may exchange data with the external host 200 in compliance with a given communication protocol.

The host interface 123 may include a plurality of physical layers. The host interface 123 may generate physical layer (PHY) error rate data including information about a noise while receiving signals, such as data, a command, and an address, from the external host 200 in high speed. The PHY error rate data may be stored in the internal buffer 122.

The ECC block 124 may perform error correction encoding on data to be transferred to the NVM device 110 by using an error correction code ECC. The ECC block 124 may perform error correction decoding on data received from the NVM device 110 by using the error correction code ECC.

When a result of the error correction decoding using the error correction code ECC indicates that error correction is uncorrectable, the ECC block 124 may store an error correction fail code UFCC. In some embodiments, the error correction fail code UFCC may be stored in the internal buffer 122.

The controller 120 may determine whether an event occurs, based on the error correction fail code UFCC and the PHY error rate stored in the internal buffer 122. In this case, the event may mean that an assert occurs in the processor 121 during the firmware operation of the storage device 100. The processor 121 may be an "ADVANCED RISC MACHINE (ARM)" core.

The assert may mean an abnormal operation of the processor 121 that is based the error correction fail code UFCC generated by the ECC block 124 or the PHY error rate generated by the host interface 123. However, this is only an example and, the assert is not limited thereto.

The controller 120 may generate event data indicating that an event occurs, based on assert data. A configuration in which the storage device 100 records and outputs the generated event data will be described in detail below.

The PMIC 130 may generate data associated with power consumption of the storage device 100 or one or more components of the storage device 100. The data associated with power consumption may include voltage data and current data.

The PMIC 130 may detect the entry into an overvoltage protection mode OVP based on the voltage data of the storage device 100. The PMIC 130 may send overvoltage protection data OVPD, which indicate that the PMIC 130 enters the overvoltage protection mode OVP, to the controller 120. The controller 120 may generate event data indicating that an event occurs, based on the overvoltage protection data OVPD. A configuration in which the event data based on the voltage data are recorded and output will be described in detail below.

The PMIC 130 may detect the entry into an overcurrent protection mode OCP based on the current data of the storage device 100. The PMIC 130 may send overcurrent protection data OCPD, which indicate that the PMIC 130 enters the overcurrent protection mode OCP, to the controller 120. The controller 120 may generate event data indicating that an event occurs, based on the overcurrent protection data OCPD. A configuration in which the event data based on the current data are recorded and output will be described in detail below.

The combo IC 140 may be connected with the controller 120 through a plurality of first channels. The combo IC 140 may be connected with the external host 200 through a plurality of second channels. The combo IC 140 may include a temperature sensor 141 and a memory 142.

The temperature sensor 141 may obtain information about a temperature of the storage device 100. The temperature sensor 141 may provide the controller 120 with temperature data including the temperature information through the first channels.

The controller 120 may receive the temperature data from the temperature sensor 141 and may determine whether an event occurs. The controller 120 may generate the event data, which indicate that an event occurs, based on the temperature data. A configuration in which the event data based on the temperature data are generated, recorded, and output will be described in detail below.

The memory 142 may include at least one of a ROM, a PROM, an EPROM, and an EEPROM. Below, various embodiments will be described under the condition that the memory 142 is the EEPROM.

The memory 142 may store the event data based on the first command CMD1 and the address ADDR that the controller 120 sends through the first channels. The first command CMD1 and the address ADDR may be a command and an address provided from the external host 200 to the controller 120. In other words, the controller 120 may receive the first command CMD1 and the address ADDR from the external host 200 and may provide the first command CMD1 and the address ADDR through the first channels to the combo IC 140.

The event data may mean data that are generated based on at least one of the temperature data, the overvoltage protection data OVPD, the overcurrent protection data OCPD, and the assert data. A configuration in which the memory 142 stores the event data will be described in detail below.

When the controller 120 recognizes the first command CMD1 and the address ADDR of the external host 200, the combo IC 140 included in the storage device 100 may output the event data to the controller 120 through the first channels, based on the first command CMD1 and the address ADDR received through the first channels from the controller 120.

When the controller 120 fails to recognize the first command CMD1 and the address ADDR of the external host 200, the combo IC 140 may output the event data to the controller 120 through the second channels, based on a command CMD' and the address ADDR received through the second channels from the external host 200. Based on an absence of response from the controller 120 about the first command CMD1 and the address ADDR, the external host 200 may transmit the command CMD' and the address ADDR to the combo IC 140 through the second channels.

Figure 2:
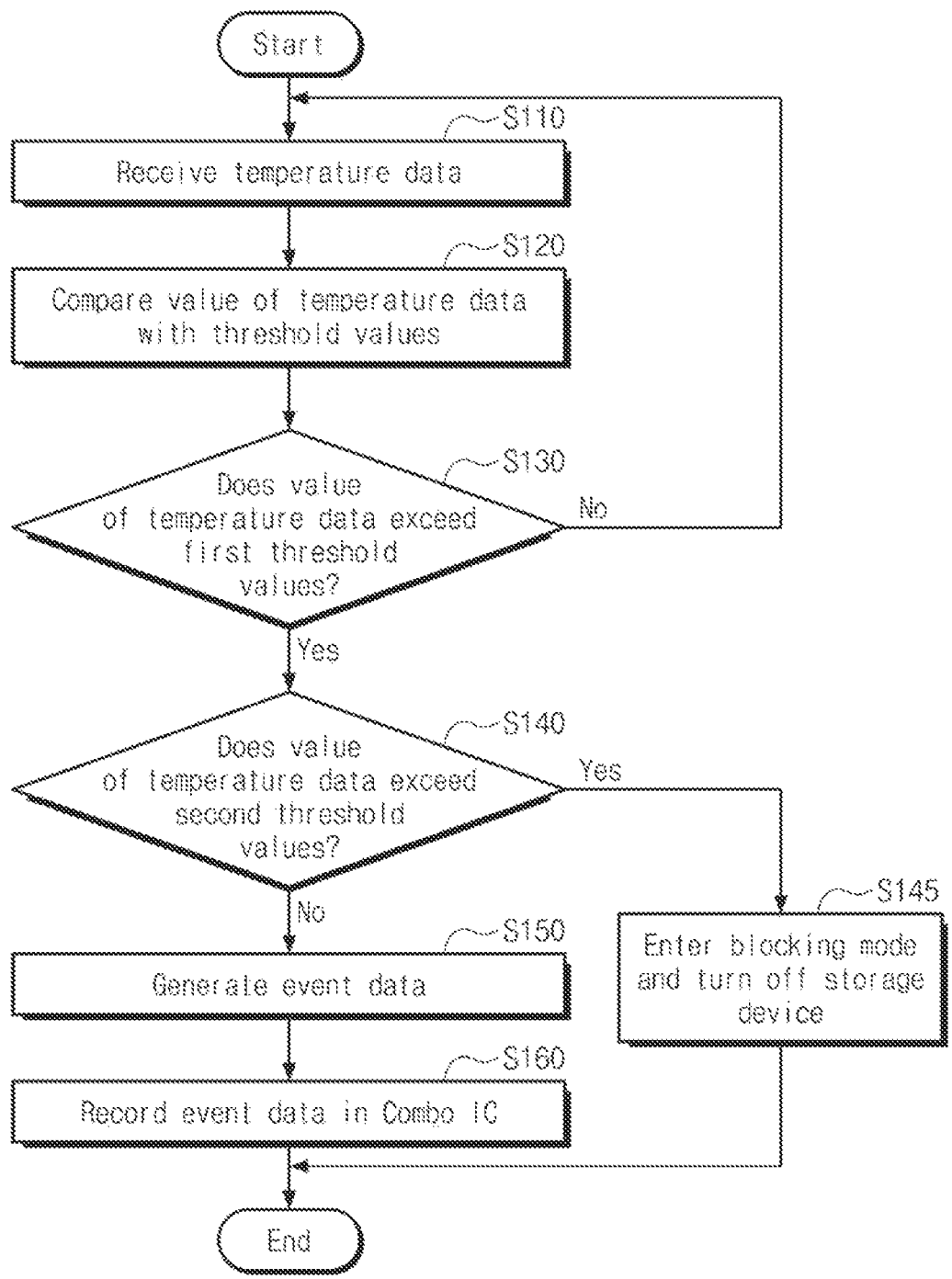
FIG. 2 is a flowchart of an operation method of a storage device recording event data generated based on temperature data, according to some embodiments.

FIG. 2 is a flowchart of an operation method of a storage device recording event data generated based on temperature data, according to some embodiments.

Referring to FIGS. 1 and 2, in operation S110, the controller 120 may receive temperature data from the combo IC 140 through the first channels. The temperature data may be periodically provided from the combo IC 140 to the controller 120 through the first channels.

In operation S120, the controller 120 may compare a value of the temperature data and threshold values stored in the internal buffer 122.

In operation S130, the controller 120 may determine whether the value of the temperature data exceeds a first threshold value. When it is determined that the value of the temperature data exceeds a first threshold value (operation S130, Yes, the controller 120 may proceed to operation S140. For example, the controller 120 may determine to enter the critical mode and may determine that an event occurs.

When it is determined that the value of the temperature data is equal to or smaller than the first threshold value (operation S130, No), the procedure may return to operation S110.

In operation S140, the controller 120 may determine whether the value of the temperature data exceeds a second threshold value. When it is determined that the value of the temperature data exceeds the second threshold value (operation S140, Yes), the controller 120 may determine to enter the blocking mode and may turn off the storage device 100 (operation S145).

When it is determined that the value of the temperature data is equal to or smaller than the second threshold value (operation S140, No), operation S150 and operation S160 may be performed.

In operation S150, the controller 120 may generate the event data, which indicate that an event occurs, based on the temperature data corresponding to the critical mode.

In operation S160, the controller 120 may record the generated event data in the combo IC 140 through the first channels.

Figure 3:
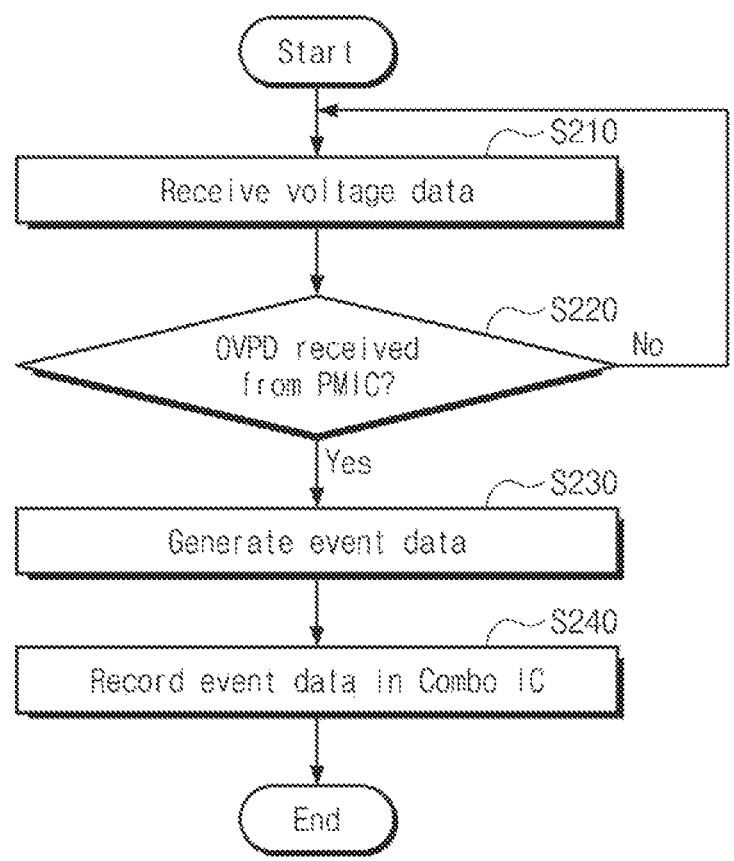
FIG. 3 is a flowchart of an operation method of a storage device recording event data generated based on voltage data, according to some embodiments.

FIG. 3 is a flowchart of an operation method of a storage device recording event data generated based on voltage data, according to some embodiments.

Referring to FIGS. 1 and 3, in operation S210, the controller 120 may receive voltage data from the PMIC 130. The voltage data may be periodically provided from the PMIC 130 to the controller 120.

The voltage data may include a plurality of voltage levels. The highest voltage levels among the plurality of voltage levels of pieces of voltage data periodically provided to the controller 120 may have different values.

In operation S220, the controller 120 may determine whether overvoltage protection data OVPD is received from the PMIC 130. The overvoltage protection data OVPD may refer to data that are generated when a magnitude of a voltage corresponding to the highest voltage level of the voltage data exceeds a threshold value.

When the controller 120 receives the overvoltage protection data OVPD from the PMIC 130 (operation S220, Yes), operation S230 and operation S240 may be performed. When the controller 120 does not receive the overvoltage protection data OVPD from the PMIC 130 (operation S220, No), the procedure may return to operation S210.

In operation S230, the controller 120 may generate event data indicating that an event occurs, based on the overvoltage protection data OVPD.

In operation S240, the controller 120 may record the generated event data in the combo IC 140 through the first channels.

Figure 4:
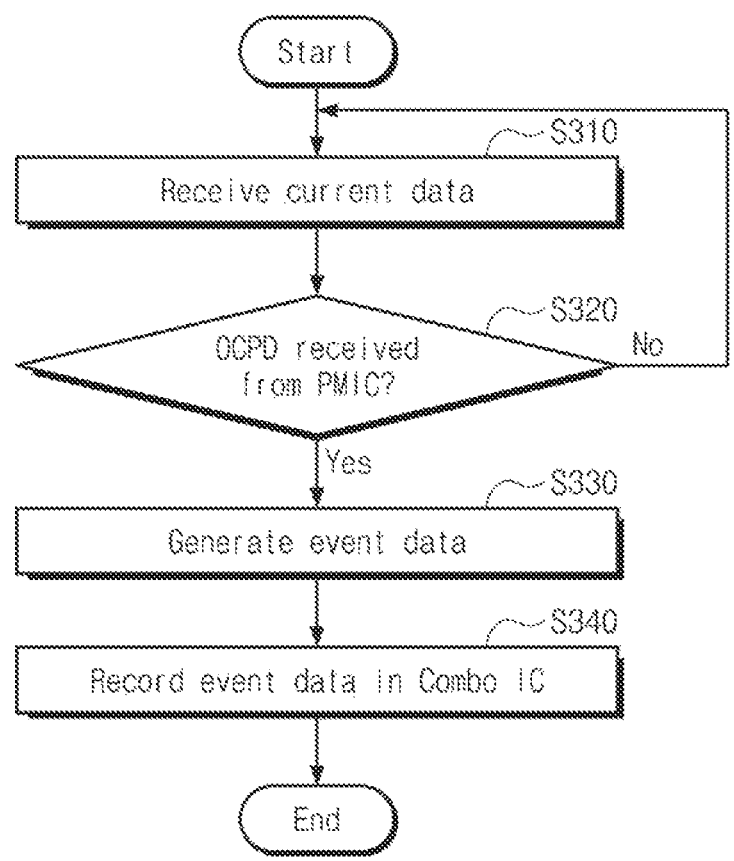
FIG. 4 is a flowchart of an operation method of a storage device recording event data generated based on current data, according to some embodiments.

FIG. 4 is a flowchart of an operation method of a storage device recording event data generated based on current data, according to some embodiments.

Referring to FIGS. 1 and 4, in operation S310, the controller 120 may receive current data from the PMIC 130. The current data may be periodically provided from the PMIC 130 to the controller 120.

In operation S320, the controller 120 may determine whether overcurrent protection data OCPD is received from the PMIC 130. The overcurrent protection data OCPD may refer to data that have the maximum current amount when the PMIC 130 enters the overcurrent protection mode.

When the controller 120 receives the overcurrent protection data OCPD from the PMIC 130 (operation S320, Yes), operation S330 and operation S340 may be performed. When the controller 120 does not receive the overcurrent protection data OCPD from the PMIC 130 (operation S320, No), the procedure may return to operation S310.

In operation S330, the controller 120 may generate event data indicating that an event occurs, based on the on the overcurrent protection data OCPD.

In operation S340, the controller 120 may record the generated event data in the combo IC 140 through the first channels.

Figure 5:
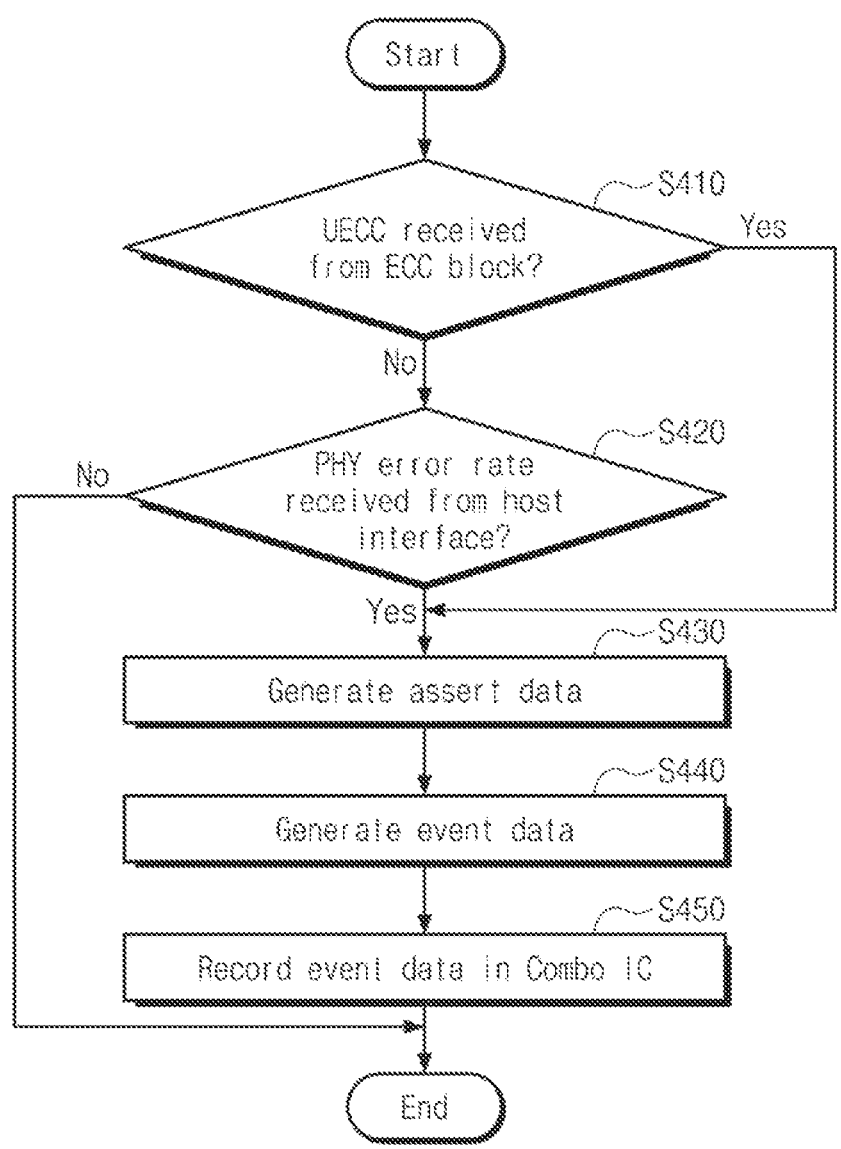
FIG. 5 is a flowchart of an operation method of a storage device storing event data generated based on an error correction fail code or a PHY error rate, according to some embodiments.

FIG. 5 is a flowchart of an operation method of a storage device storing event data generated based on the error correction fail code UFCC or the PHY error rate, according to some embodiments.

Referring to FIGS. 1 and 5, in operation S410, the controller 120 may determine whether an error correction fail code UFCC is received from the ECC block 124. When an error correction encoding result indicates that error correction fails, the ECC block 124 may generate the error correction fail code UFCC.

When the controller 120 receives the error correction fail code UFCC from the ECC block 124 (operation S410, Yes), operation S430 and operation S440 may be performed. When the controller 120 does not receive the error correction fail code UFCC from the ECC block 124 (operation S410, No), operation S420 may be performed.

In operation S420, the controller 120 may determine whether PHY error rate data is received from the host interface 123. The host interface 123 may generate the PHY error rate data including information about a noise while receiving signals, such as data, a command, and an address, from the external host 200 in high speed.

When the controller 120 receives the PHY error rate data from the host interface 123 (operation S420, Yes), operation S430 and operation S440 may be performed. When the controller 120 does not receive the PHY error rate data from the host interface 123 (operation S420, No), the procedure ends.

However, unlike the embodiment illustrated FIG. 5, in some embodiments, the controller 120 may determine whether the PHY error rate data is received prior to determining whether the error correction fail code UFCC is received. In other words, in some embodiments, the decision blocks S410 and S420 may be switched such that operation S420 is performed first and then operation S410 is performed. In some embodiments, the controller 120 may determine that an event occurs, based on both the error correction fail code UFCC and the PHY error rate data.

In operation S430, the controller 120 may generate assert data based on at least one of the error correction fail code UFCC and the PHY error rate data.

In operation S440, the controller 120 may generate event data indicating that an event occurs, based on the assert data.

In operation S450, the controller 120 may record the generated event data in the combo IC 140 through the first channels.

Figure 6:
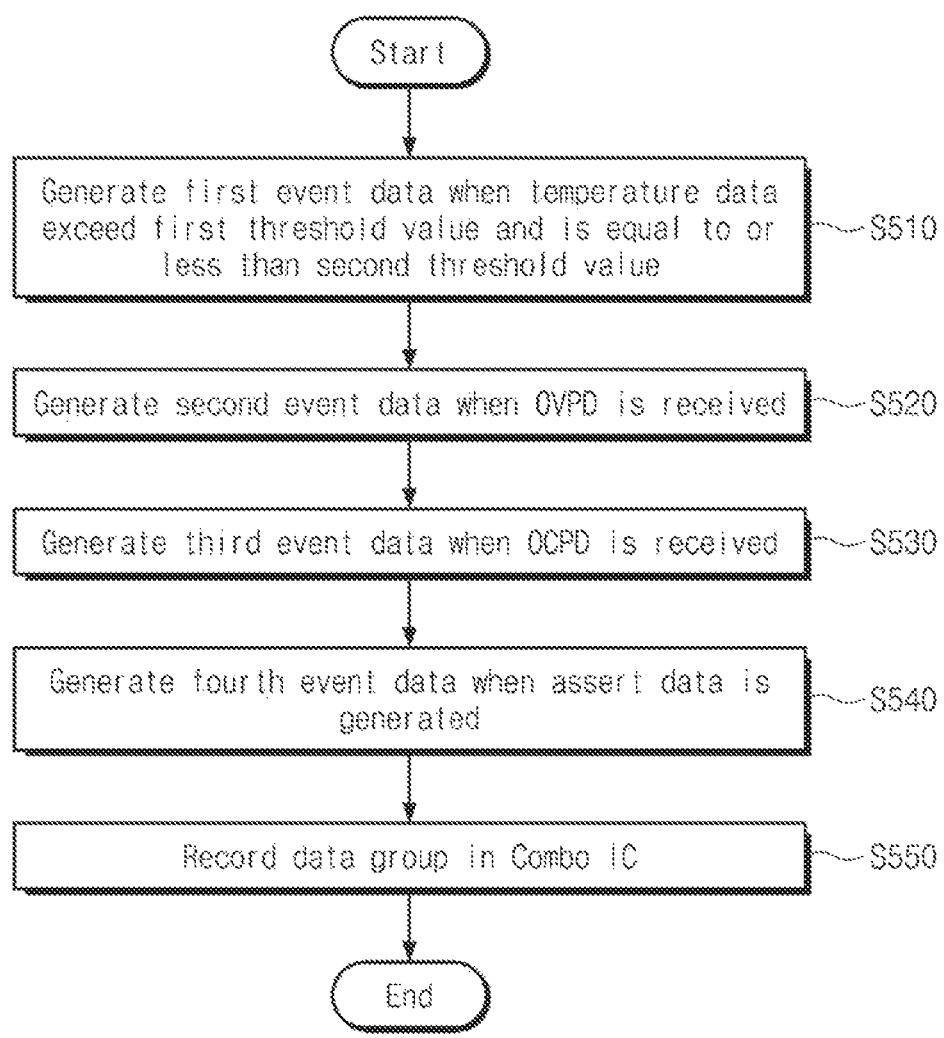
FIG. 6 is a flowchart of an operation method of a storage device recording a data group including event data corresponding to at least one event occurring from among events of FIGS. 2 to 5, according to some embodiments.

FIG. 6 is a flowchart of an operation method of a storage device recording a data group including event data corresponding to at least one event occurring from among events of FIGS. 2 to 5, according to some embodiments.

Referring to FIGS. 1 to 6, in operation S510, the controller 120 may generate first event data indicating that an event occurs when temperature data exceeds the first threshold value and is equal to or less than the second threshold value. For example, the controller 120 may determine that an event occurs, based on temperature data received from the temperature sensor 141. When a value of the temperature data exceeds the first threshold value and is equal to or smaller than the second threshold value, the controller 120 may generate the first event data indicating that an event occurs, based on the temperature data.

In operation S520, the controller 120 may generate second event data when overvoltage protection data OVPD is received. For example, the controller 120 may determine that an event occurs, based on the overvoltage protection data OVPD from the PMIC 130. The controller 120 may generate the second event data indicating that an event occurs, based on the overvoltage protection data OVPD.

In operation S530, the controller may generate third event data when overcurrent protection data OCPD is received. For example, the controller 120 may determine that an event occurs, based on the overcurrent protection data OCPD received from the PMIC 130. The controller 120 may generate the third event data indicating that an event occurs, based on the overcurrent protection data OCPD.

In operation S540, the controller 120 may generate fourth event data when assert data is generated. For example, the controller 120 may determine that an event occurs, based on at least one of the error correction fail code UFCC received from the ECC block 124 or the PHY error rate data received from the host interface 123 and may generate the assert data. The controller 120 may generate the fourth event data indicating that an event occurs, based on the assert data.

In operation S550, the controller 120 may record a data group including at least one of the first to fourth event data in the combo IC 140.

Figure 7:
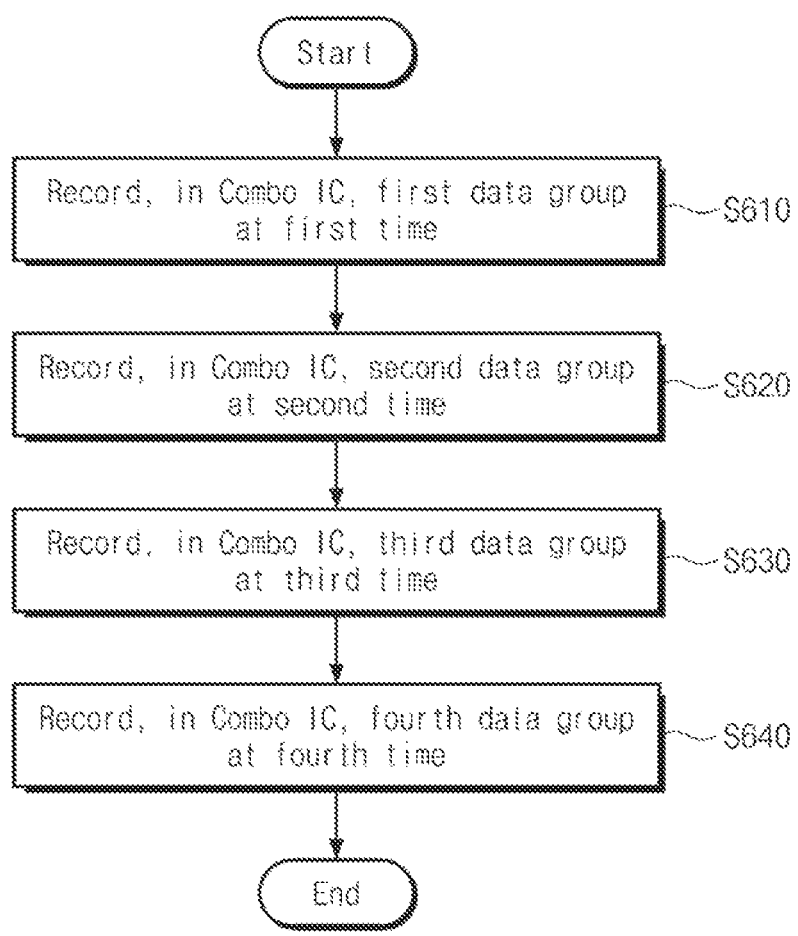
FIG. 7 is a flowchart of an operation of a storage device recording a plurality of data groups each including at least one event data of FIG. 6 during different times, according to some embodiments.

FIG. 7 is a flowchart of an operation of a storage device recording a plurality of data groups each including at least one event data of FIG. 6 during different times, according to some embodiments.

Referring to FIGS. 1 and 7, in operation S610, the controller 120 may record, in the combo IC 140, a first data group at a first time. For example, during a first time, the controller 120 may generate first event data based on the temperature data, may generate second event data based on the overvoltage protection data OVPD, may generate third event data based on the overcurrent protection data OCPD, or may generate fourth event data based on the assert data.

In this case, the controller 120 may send the pieces of event data to the combo IC 140 through the first channels.

The controller 120 may record the first data group, which includes at least one of the first to fourth event data generated during the first time, at the combo IC 140 together with information about the first time, based on the first command CMD1 and the address ADDR.

In operation S620, the controller 120 may record, in the combo IC 140, a second data group at a second time. For example, during a second time, the controller 120 may generate the first event data based on the temperature data, may generate the second event data based on the overvoltage protection data OVPD, may generate the third event data based on the overcurrent protection data OCPD, or may generate the fourth event data based on the assert data.

In this case, the controller 120 may send the pieces of event data to the combo IC 140 through the first channels.

The controller 120 may record the second data group, which includes at least one of the first to fourth event data generated during the second time, at the combo IC 140 together with information about the second time, based on the first command CMD1 and the address ADDR.

In operation S630, the controller 120 may record, in the combo IC 140, a third data group at a third time. For example, during a third time, the controller 120 may generate the first event data based on the temperature data, may generate the second event data based on the overvoltage protection data OVPD, may generate the third event data based on the overcurrent protection data OCPD, or may generate the fourth event data based on the assert data.

In this case, the controller 120 may send the pieces of event data to the combo IC 140 through the first channels.

The controller 120 may record the third data group, which includes at least one of the first to fourth event data generated during the third time, at the combo IC 140 together with information about the third time, based on the first command CMD1 and the address ADDR.

In operation S640, the controller 120 may record, in the combo IC 140, a fourth data group at a fourth time. For example, during a fourth time, the controller 120 may generate the first event data based on the temperature data, may generate the second event data based on the overvoltage protection data OVPD, may generate the third event data based on the overcurrent protection data OCPD, or may generate the fourth event data based on the assert data.

In this case, the controller 120 may send the pieces of event data to the combo IC 140 through the first channels.

The controller 120 may record the fourth data group, which includes at least one of the first to fourth event data generated during the fourth time, at the combo IC 140 together with information about the fourth time, based on the first command CMD1 and the address ADDR.

FIG. 8 is a table illustrating data included in a plurality of data groups of FIG. 7 in detail. In an embodiment, in FIG. 8, "Time Tick" may represent a region in which time data including information about a time are stored.

"Temp Debug Log" may represent a region in which temperature data of the temperature sensor 141 are stored. The "Temp Debug Log" may include temperature data indicating a temperature value that exceeds the first threshold value described above and is equal to or smaller than the second threshold value described above.

"PMIC Debug Log" may represent a region in which power consumption data of the PMIC 130 are stored. The "PMIC Debug Log" may include the overcurrent protection data OCPD, the overvoltage protection data OVPD, power state detection data "POWER GOOD all" (PG all) provided from the outside, and voltage data "External Voltage" provided from the outside. However, this is only an example and data included in the "PMIC Debug Log" is not limited thereto.

"SFR Reg Value" may represent a region of a special function register SFR. The special function register SFR may include data associated with a memory such as DRAM MR4 or SRAM, data associated with a refresh rate of a storage device, data associated with a communication protocol such as I2C or UART, and assert data based on error correction fail or a physical layer error rate. However this is only an example and data included in the "SFR Debug Log" is not limited thereto.

In some embodiments, in FIG. 8, the size of each data may be expressed by a decimal number, and the unit of the size of each data may be a byte (B). Each data may be recorded during a time from a start time point to an end time point. Each of the start time point and the end time point is expressed by a hexadecimal number. Below, each of the start time point and the end time point will be described by using a decimal number.

Referring to FIGS. 1, 7, and 8, EDR[0] may mean a first data group. EDR[1] may mean a second data group. EDR[2] may mean a third data group. EDR[3] may mean a fourth data group.

The first to fourth data groups in FIG. 8 may respectively correspond to the first to fourth data groups of FIG. 7. Thus, additional description associated with similar components will be omitted to avoid redundancy.

The first data group EDR[0] may include time data corresponding to a first time having a value of 4 bytes from 0 to 3, "Temp Debug Log" having a value of 32 bytes from 4 to 35 during the first time, "PMIC Debug Log" having a value of 32 bytes from 36 to 67 during the first time, and "SFR Reg Value" having a value of 60 bytes from 68 to 127 during the first time.

The second data group EDR[1] may include time data corresponding to a second time having a value of 4 bytes from 128 to 131, "Temp Debug Log" having a value of 32 bytes from 132 to 163 during the second time, "PMIC Debug Log" having a value of 32 bytes from 164 to 195 during the second time, and "SFR Reg Value" having a value of 60 bytes from 196 to 255 during the second time.

The third data group EDR[2] may include time data corresponding to a third time having a value of 4 bytes from 256 to 259, "Temp Debug Log" having a value of 32 bytes from 260 to 291 during the third time, "PMIC Debug Log" having a value of 32 bytes from 292 to 323 during the third time, and "SFR Reg Value" having a value of 60 bytes from 324 to 383 during the third time.

The fourth data group EDR[3] may include time data corresponding to a fourth time having a value of 4 bytes from 384 to 387, "Temp Debug Log" having a value of 32 bytes from 388 to 419 during the fourth time, "PMIC Debug Log" having a value of 32 bytes from 420 to 451 during the fourth time, and "SFR Reg Value" having a value of 60 bytes from 452 to 511 during the fourth time.

In some embodiment, numbers of bits of data respectively included in the first to fourth data groups EDR[0] to EDR[3] may be identical. However, embodiments are not limited thereto. For example, in some embodiments, the numbers of bits of data respectively included in the first to fourth data groups EDR[0] to EDR[3] may be different.

Figure 9:
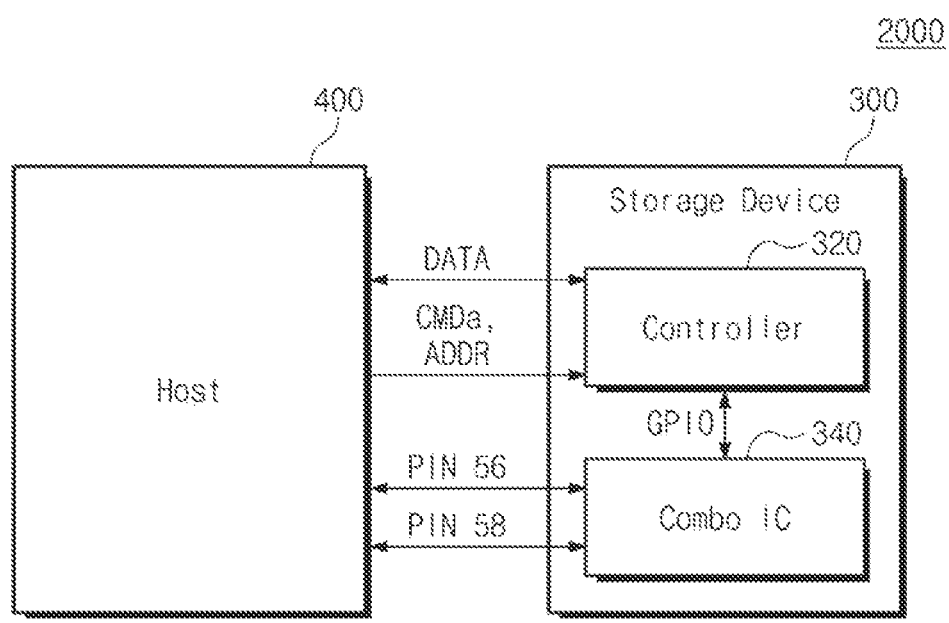
FIG. 9 is a diagram illustrating components of an electronic device performing an event read operation for recorded event data, according to some embodiments.

FIG. 9 is a diagram illustrating components of an electronic device 2000 performing an event read operation for recorded event data. In some embodiments, a controller 320 and a combo IC 340 included in a storage device 300 of FIG. 9 respectively correspond to the controller 120 and the combo IC 140 included in the storage device 100 of FIG. 1. Thus, additional description associated with similar components and similar operations will be omitted to avoid redundancy.

Referring to FIGS. 1, 8, and 9, the first channels may include a plurality of channels connecting the controller 120/320 and the combo IC 140/340. The controller 120/320 may send a general purpose input/output (GPIO) signal to the combo IC 140/340 through the first channels.

A logical value of the GPIO signal may be set to "0" such that a page address of the memory 142 included in the combo IC 140/340 has a value of "0" or may be set to "1" such that a page address of the memory 142 included in the combo IC 140/340 has a value of "1".

The controller 120/320 may receive a first-type command CMDa and the address ADDR from the external host 200/400. The controller 120/320 may select one of the logical values of the GPIO signal based on the first-type command CMDa and the address ADDR.

The controller 120/320 may control the combo IC 140/340 based on the selected logical value of the GPIO signal such that a page address of the memory 142 is selected.

In some embodiments, the first to fourth data groups EDR[0] to EDR[3] included in the table of FIG. 8 may be stored in a region of the memory 142, which has a page address of "1". Although not illustrated, in some embodiments, fifth to eighth data groups generated after the fourth data group EDR[3] may be stored in a region of the memory 142, which has a page address of "0".

Afterwards, when four data groups are additionally generated, the controller 120/320 may change the page address of the memory 142 to "1" based on the GPIO signal. The controller 120/320 may overwrite the first to fourth data groups EDR[0] to EDR[3] present in the region of the memory 142, which has the page address of "1", with the four data groups newly added, in the region having the page address of "1".

However, embodiments are not limited thereto. For example, in some embodiments, the first to fourth data groups EDR[0] to EDR[3] included in the table of FIG. 8 may be stored in a region of the memory 142, which has a page address of "0". Although not illustrated, in some embodiments, fifth to eighth data groups generated after the fourth data group EDR[3] may be stored in a region of the memory 142, which has a page address of "1".

Afterwards, when four data groups are additionally generated, the controller 120/320 may change the page address of the memory 142 to "0" based on the GPIO signal. The controller 120/320 may overwrite the first to fourth data groups EDR[0] to EDR[3] present in the region of the memory 142, which has the page address of "0", with the four data groups newly added, in the region having the page address of "0".

The second channels may include a plurality of channels connecting the external host 200/400 and the combo IC 140/340. First ends of the second channels may be electrically connected with M.2 connector pins of the storage device 100/300, and second ends of the second channels that are opposite the first ends may be electrically connected with the external host 200/400.

In some embodiments, the M.2 connector pins may include pin 56 and pin 58. Pin 56 may be connected with one end of a data line of the second channels.

Pin 58 may be connected with one end of a clock line of the second channels. The storage device 100/300 may receive a second-type command CMDb and the address ADDR from the external host 200/400 through pin 56 and pin 58 and may output a data group including event data. However, components of the storage device 100/300 connected with one ends of the second channels are not limited to the M.2 connector pins.

When the controller 120/320 fails to recognize the first-type command CMDa and the address ADDR of the external host 200/400, the combo IC 140/340 may output a plurality of data groups each including at least one event data present in the memory 142 to the external host 200/400 through pin 56 and pin 58. Based on an absence of response from the controller 120/320 about the first-type command CMDa and the address ADDR, the external host 200/400 may send the second-type command CMDb and the address ADDR to the combo IC 140/340 through pin 56 and pin 58.

Figure 10A:
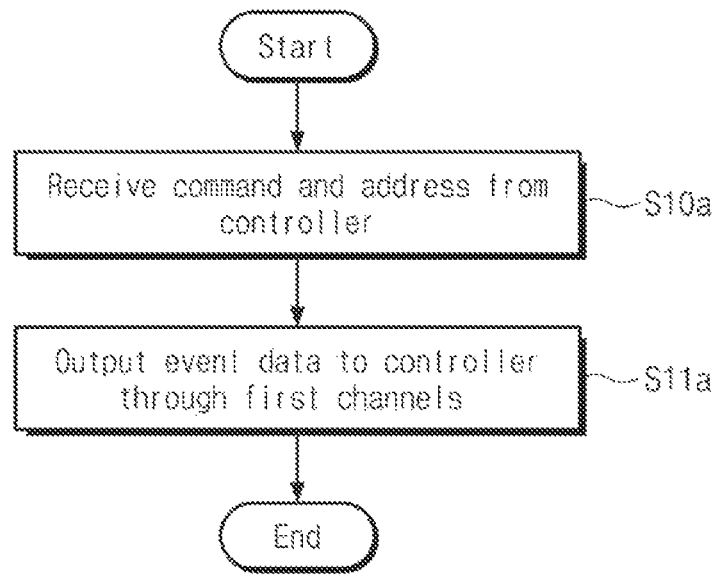
FIG. 10A is a flowchart of an operation method of a storage device outputting event data recorded at a combo IC to a controller, according to some embodiments.

FIG. 10A is a flowchart of an operation method of a storage device outputting event data recorded at a combo IC to a controller, according to some embodiments.

Referring to FIGS. 1, 9, and 10A, in operation S10*a*, the combo IC 140/340 included in the storage device 100/300 may receive a command and an address from the controller 120/320. The command and the address may be the first-type command CMDa and the address ADDR that the controller 120/320 receives from the external host 200/400.

In operation S11*a*, the combo IC 140/340 may output the recorded event data to the controller 120/320 through the first channels based on the first-type command CMDa and the address ADDR.

Figure 10B:
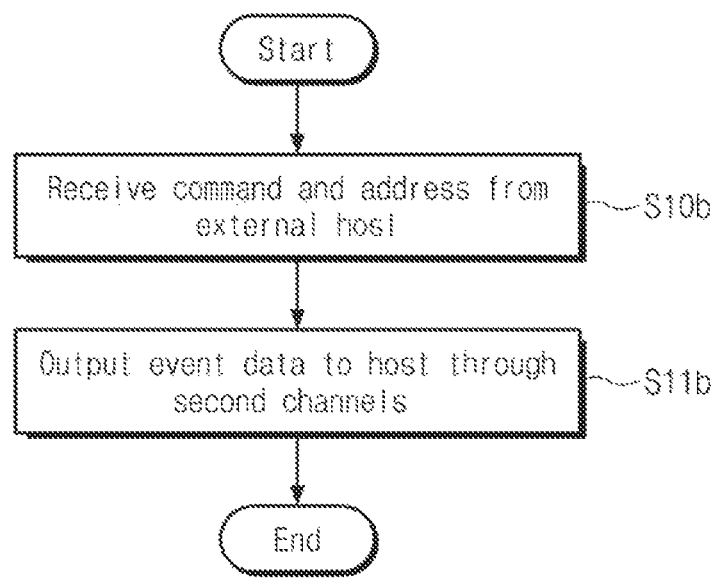
FIG. 10B is a flowchart of an operation method of a storage device outputting event data recorded at a combo IC to an external host, according to some embodiments.

FIG. 10B is a flowchart of an operation method of a storage device outputting event data recorded at a combo IC to an external host, according to some embodiments.

Referring to FIGS. 1, 9, and 10B, in operation S1ob, the combo IC 140/340 included in the storage device 100/300 may receive a command and an address from the external host 200/400. The command and the address may be the second-type command CMDb and the address ADDR that the combo IC 140/340 directly receives from the external host 200/400.

In response to the controller 120/320 failing to recognize the first-type command CMDa and the address ADDR, the external host 200/400 may directly send the second-type command CMDb and the address ADDR to the combo IC 140/340 through the second channels. Based on an absence of response from the controller 120/320 about the first-type command CMDa and the address ADDR, the external host 200/400 may send the second-type command CMDb and the address ADDR to the combo IC 140/340 through the second channels.

In operation S11b, the combo IC 140/340 may output the recorded event data to the external host 200/400 through the second channels based on the second-type command CMDb and the address ADDR.

Figure 11:
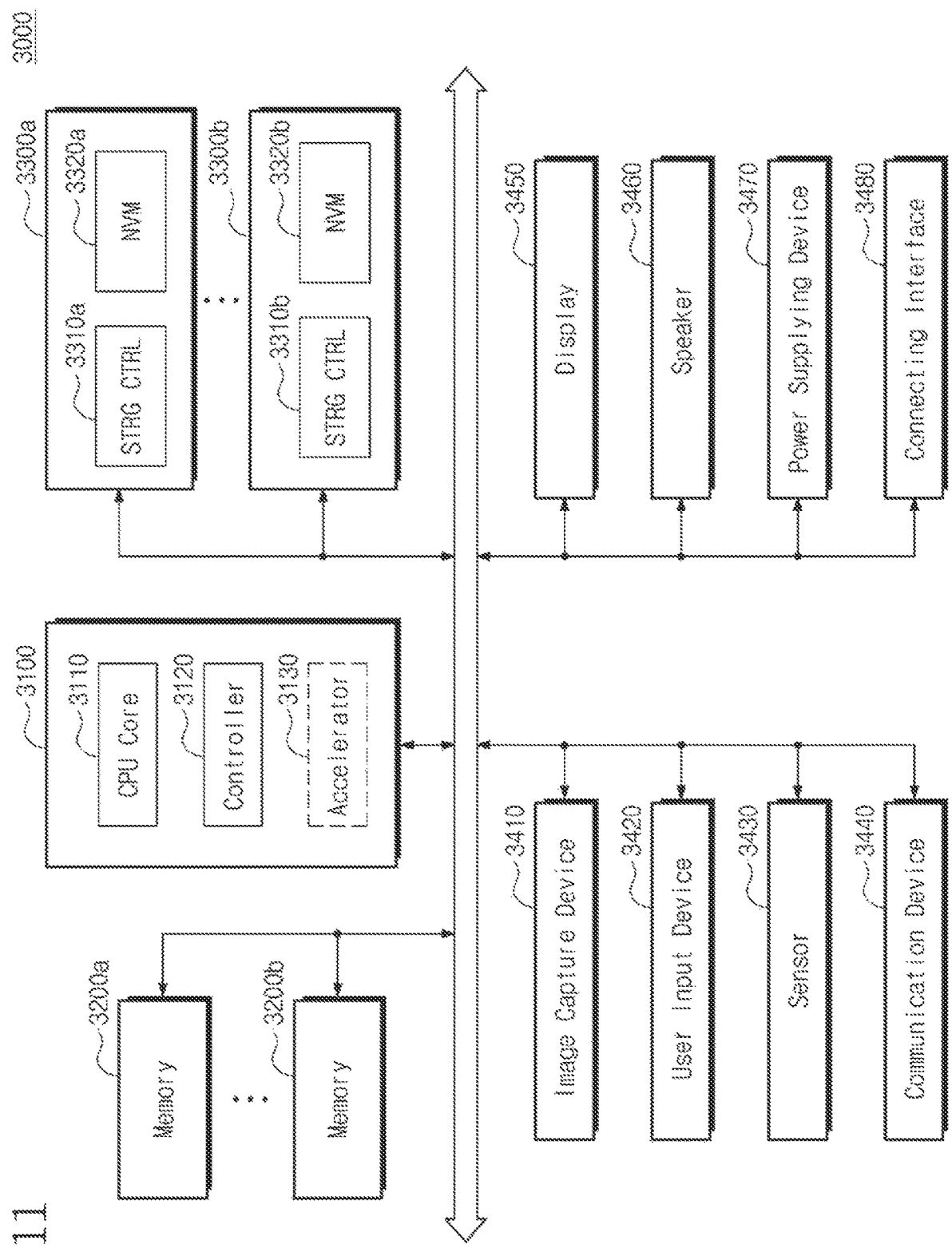
FIG. 11 is a diagram illustrating an electronic device to which a storage device according to some embodiments is applied.

FIG. 11 is a diagram of an electronic device 3000 to which a storage device is applied, according to some embodiments.

The electronic device 3000 of FIG. 11 may be a mobile device, such as a portable communication terminal (e.g., a mobile phone), a smartphone, a tablet personal computer (PC), a wearable device, a healthcare device, or an Internet of things (IOT) device. However, the electronic device 3000 of FIG. 11 is not necessarily limited to a mobile device and may be a PC, a laptop computer, a server, a media player, or an automotive device (e.g., a navigation device).

Referring to FIG. 11, the electronic device 3000 may include a main processor 3100, memories (e.g., 3200a and 3200b), and storage devices (e.g., 3300a and 3300b). In some embodiments, the electronic device 3000 may include at least one of an image capturing device 3410, a user input device 3420, a sensor 3430, a communication device 3440, a display 3450, a speaker 3460, a power supplying device 3470, and a connecting interface 3480.

The main processor 3100 may control all operations of the electronic device 3000, more specifically, operations of other components included in the electronic device 3000. The main processor 3100 may be implemented as a processor, a dedicated processor, or an application processor.

The main processor 3100 may include at least one CPU core 3110 and further include a controller 3120 configured to control the memories 3200a and 3200b and/or the storage devices 3300a and 3300b. In some embodiments, the main processor 3100 may further include an accelerator 3130, which is a dedicated circuit for a high-speed data operation, such as an artificial intelligence (AI) data operation. The accelerator 3130 may include a graphics processing unit (GPU), a neural processing unit (NPU) and/or a data processing unit (DPU) and be implemented as a chip that is physically separate from the other components of the main processor 3100.

The memories 3200a and 3200b may be used as main memory devices of the electronic device 3000. Although each of the memories 3200a and 3200b may include a volatile memory, such as static random access memory (SRAM) and/or dynamic RAM (DRAM), each of the memories 3200a and 3200b may include non-volatile memory, such as a flash memory, phase-change RAM (PRAM) and/or resistive RAM (RRAM). The memories 3200a and 3200b may be implemented in the same package as the main processor 3100.

The storage devices 3300a and 3300b may serve as non-volatile storage devices configured to store data regardless of whether power is supplied thereto, and have larger storage capacity than the memories 3200a and 3200b. The storage devices 3300a and 3300b may respectively include storage controllers (STRG CTRL) 3310a and 3310b and NVM (Non-Volatile Memory)s 3320a and 3320b configured to store data via the control of the storage controllers 3310a and 3310b. Although the NVMs 3320a and 3320b may include flash memories having a two-dimensional (2D) structure or a three-dimensional (3D) V-NAND structure, the NVMs 3320a and 3320b may include other types of NVMs, such as PRAM and/or RRAM.

The storage devices 3300a and 3300b may correspond to the storage device 100/300 of the present disclosure illustrated in FIGS. 1 and 9. The storage controllers 3310a and 3310b may correspond to the controller 120/320 of the present disclosure illustrated in FIGS. 1 and 9. The NVMs 3320a and 3320b may correspond to the NVM device 110 of the present disclosure illustrated in FIG. 1.

The storage devices 3300a and 3300b may be physically separated from the main processor 3100 and included in the electronic device 3000 or implemented in the same package as the main processor 3100. In some embodiments, the storage devices 3300a and 3300b may have types of solid-state devices (SSDs) or memory cards and be removably combined with other components of the electronic device 3000 through an interface, such as the connecting interface 3480 that will be described below. The storage devices 3300a and 3300b may be devices to which a standard protocol, such as a universal flash storage (UFS), an embedded multi-media card (eMMC), or anon-volatile memory express (NVMe), is applied, without being limited thereto.

The image capturing device 3410 may capture still images or moving images. The image capturing device 3410 may include a camera, a camcorder, and/or a webcam.

The user input device 3420 may receive various types of data input by a user of the electronic device 3000 and include a touch pad, a keypad, a keyboard, a mouse, and/or a microphone.

The sensor 3430 may detect various types of physical quantities, which may be obtained from the outside of the electronic device 3000, and convert the detected physical quantities into electric signals. The sensor 3430 may include a temperature sensor, a pressure sensor, an illuminance sensor, a position sensor, an acceleration sensor, a biosensor, and/or a gyroscope sensor.

The communication device 3440 may transmit and receive signals between other devices outside the electronic device 3000 according to various communication protocols. The communication device 3440 may include an antenna, a transceiver, and/or a modem.

The display 3450 and the speaker 3460 may serve as output devices configured to respectively output visual information and auditory information to the user of the electronic device 3000.

The power supplying device 3470 may appropriately convert power supplied from a battery (not shown) embedded in the electronic device 3000 and/or an external power source, and supply the converted power to each of components of the electronic device 3000.

The connecting interface 3480 may provide connection between the electronic device 3000 and an external device, which is connected to the electronic device 3000 and capable of transmitting and receiving data to and from the electronic device 3000. The connecting interface 3480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to some embodiments, a storage device providing event data and an operation method of the storage device may output event data under control of an external host, even when abnormality occurs in an internal controller of the storage device. Accordingly, the storage device may provide the event data regardless of whether abnormality occurs in the controller.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
 a non-volatile memory device including a plurality of memory blocks, each including one or more memory cells;
 a combo integrated circuit (IC) including a memory, and a temperature sensor that generates temperature data; and
 a controller connected with the combo IC through a plurality of first channels, the controller configured to control the non-volatile memory device to write data in or to read data from one or more selected memory cells of a memory block selected from the plurality of memory blocks,
 wherein, when the controller determines that a first event occurs based on the temperature data that is read from the combo IC, the controller records first event data in the memory of the combo IC,
 wherein, in a first operation mode, the combo IC outputs the first event data to the controller through the plurality of first channels based on a first command and an address received from the controller, and
 wherein, in a second operation mode, under control of an external host, the combo IC outputs the first event data to the external host through a plurality of second channels that are different from the plurality of first channels, based on a second command and the address received from the external host.

2. The storage device of claim 1, further comprising a power management integrated circuit,
 wherein, when the controller determines that a second event occurs based on at least one of overvoltage protection data or overcurrent protection data received from the power management integrated circuit, the controller records second event data in the memory of the combo IC,
 wherein, in the first operation mode, the combo IC outputs the second event data to the controller through the plurality of first channels based on the first command and the address received from the controller, and
 wherein, in the second operation mode, under control of the external host, the combo IC outputs the second event data to the external host through the plurality of second channels, based on the second command and the address received from the external host.

3. The storage device of claim 2, wherein the controller includes an error correction code (ECC) block,
 wherein, when the controller determines that a third event occurs based on an error correction fail code (UFCC) generated by the ECC block, the controller records third event data in the memory of the combo IC,
 wherein, in the first operation mode, the combo IC outputs the third event data to the controller through the plurality of first channels based on the first command and the address received from the controller, and
 wherein, in the second operation mode, under control of the external host, the combo IC outputs the third event data to the external host through the plurality of second channels, based on the second command and the address received from the external host.

4. The storage device of claim 1, wherein the controller compares a value of the temperature data with a first threshold value corresponding to a critical mode and a second threshold value corresponding to a blocking mode,
 wherein, when the value of the temperature data exceeds the first threshold value and is equal to or smaller than the second threshold value, the controller determines that the first event occurs and generates the first event data.

5. The storage device of claim 4, further comprising a power management integrated circuit,
 wherein, when a value of voltage data provided to the controller exceeds a threshold value, the power management integrated circuit generates overvoltage protection data, and
 wherein, when the controller receives the overvoltage protection data from the power management integrated circuit, the controller determines that a second event occurs and generates second event data.

6. The storage device of claim 4, further comprising a power management integrated circuit,
 wherein the power management integrated circuit generates overcurrent protection data based on a current amount when entering an overcurrent protection mode, and
 wherein, when the controller receives the overcurrent protection data from the power management integrated circuit, the controller determines that a second event occurs and generates second event data.

7. The storage device of claim 6, wherein the controller includes an ECC block,
 wherein the controller generates assert data based on an error correction fail code (UFCC) generated by the ECC block, and
 wherein, based on the assert data, the controller determines that a third event occurs and generates third event data.

8. The storage device of claim 7, wherein, when at least one event data among the first event data, the second event data, or the third event data are generated at a first time, the controller records a first data group including the at least one event data in the memory of the combo IC and records first time data in the memory of the combo IC,
 wherein, in the first operation mode, the combo IC outputs the first data group to the controller through the plurality of first channels based on the first command and the address received from the controller, and
 wherein, in the second operation mode, under control of the external host, the combo IC outputs the first data group to the external host through the plurality of second channels, based on the second command and the address received from the external host.

9. The storage device of claim 8, wherein, when the at least one event data are generated at each of a second time, a third time, and a fourth time after the first time expires, the controller further records a second data group, a third data group, and a fourth data group respectively including second time data, third time data, and fourth time data together with the at least one event data sequentially in the memory of the combo IC,
 wherein, in the first operation mode, the combo IC outputs the first data group, the second data group, the third data group and the fourth data group to the controller through the plurality of first channels based on the first command and the address received from the controller, and
 wherein, in the second operation mode, under control of the external host, the combo IC outputs the first data group, the second data group, the third data group and the fourth data group to the external host through the plurality of second channels, based on the second command and the address received from the external host.

10. The storage device of claim 9, wherein numbers of data bits respectively included in the first data group, the second data group, the third data group and the fourth data group are identical to each other.

11. An operation method of a storage device which includes a combo integrated circuit (IC) and a controller connected with the combo IC by a plurality of first channels, the operation method comprising:
 determining, by the controller, whether a first event occurs, based on temperature data that is read from the combo IC;
 when the first event occurs, recording, by the controller, first event data in a memory of the combo IC;
 in a first operation mode, outputting, by the combo IC, the first event data to the controller through the plurality of first channels based on a first command and an address received from the controller; and
 in a second operation mode, under control of an external host, outputting, by the combo IC, the first event data to the external host through a plurality of second channels different from the plurality of first channels, based on a second command and the address received from the external host.

12. The operation method of claim 11, further comprising:
 determining, at the controller, whether a second event occurs, based on overvoltage protection data or overcurrent protection data received from a power management integrated circuit;
 when the second event occurs, recording, by the controller, second event data in the memory of the combo IC;
 in the first operation mode, outputting, by the combo IC, the second event data to the controller through the plurality of first channels based on the first command and the address received from the controller; and
 in the second operation mode, under control of the external host, outputting, by the combo IC, the second event data to the external host through the plurality of second channels, based on the second command and the address received from the external host.

13. The operation method of claim 12, further comprising:
 determining, by the controller, whether a third event occurs, based on an error correction fail code (UFCC) generated by an ECC block;
 when the third event occurs, recording, by the controller, third event data in the memory of the combo IC;
 in the first operation mode, outputting, by the combo IC, the third event data to the controller through the plurality of first channels based on the first command and the address received from the controller; and
 in the second operation mode, under control of the external host, outputting, by the combo IC, the third event data to the external host through the plurality of second channels, based on the second command and the address received from the external host.

14. The operation method of claim 11, wherein the determining of whether the first event occurs includes:
 comparing, by the controller, a value of the temperature data with a first threshold value corresponding to a critical mode and a second threshold value corresponding to a blocking mode; and
 when the value of the temperature data exceeds the first threshold value and is equal to or smaller than the second threshold value, generating, by the controller, the first event data and determining that the first event occurs.

15. The operation method of claim 14, further comprising:
 determining, at the controller, whether a second event occurs,
 wherein the determining of whether the second event occurs includes:
  when a value of voltage data provided to the controller exceeds a threshold value, generating, by a power management integrated circuit, overvoltage protection data; and
  generating, by the controller, second event data based on the overvoltage protection data received from the power management integrated circuit, and determining that the second event occurs.

16. The operation method of claim 14, further comprising:
 determining, at the controller, whether a second event occurs,
 wherein the determining of whether the second event occurs includes:
  generating, by a power management integrated circuit, overcurrent protection data based on a current amount when entering an overcurrent protection mode; and
  generating, by the controller, second event data based on the overcurrent protection data received from the power management integrated circuit, and determining the second event occurs.

17. The operation method of claim 16, further comprising:
 determining, at the controller, whether a third event occurs,
 wherein the determining of whether the third event occurs includes:
  generating, by the controller, assert data based on an error correction fail code generated by an error correction code block included in the controller; and
  generating, by the controller, third event data based on the assert data, and determining that the third event occurs.

18. The operation method of claim 17, wherein, when at least one event data among the first event data, the second event data, or the third event data are generated at a first time, recording, by the controller, a first data group including the at least one event data in the memory of the combo IC and recording first time data in the memory of the combo IC;
 in the first operation mode, outputting, by the combo IC, the first data group to the controller through the plurality of first channels based on the first command and the address received from the controller; and
 in the second operation mode, under control of the external host, outputting, by the combo IC, the first data group to the external host through the plurality of second channels, based on the second command and the address received from the external host.

19. The operation method of claim 18, wherein, when the at least one event data are generated at each of a second time, a third time, and a fourth time after the first time expires, recording, by the controller, a second data group, a third data group, and a fourth data group respectively including second time data, third time data, and fourth time data together with the at least one event data sequentially in the memory of the combo IC;
 in the first operation mode, outputting, by the combo IC, the first data group, the second data group, the third data group, and the fourth data group to the controller through the plurality of first channels based on the first command and the address received from the controller; and in the second operation mode, under control of the external host, outputting, by the combo IC, the first data group, the second data group, the third data group, and the fourth data group to the external host through the plurality of second channels, based on the second command and the address received from the external host.

20. An operation method of a storage device which includes a combo integrated circuit (IC) and a controller connected with the combo IC by a plurality of first channels, the operation method comprising:

determining, by the controller, whether a first event occurs, based on temperature data read from the combo IC;

determining, by the controller, whether a second event occurs, based on overvoltage protection data or overcurrent protection data received from a power management integrated circuit;

determining, by the controller, whether a third event occurs, based on an error correction fail code (UFCC) generated by an ECC block;

when at least one event among the first event, the second event, or the third event occurs, recording, by the controller, at least one event data corresponding to the at least one event in a memory of the combo IC;

in a first operation mode, outputting, by the combo IC, the at least one event data to the controller through the plurality of first channels based on a first command and an address received from the controller; and in a second operation mode, under control of an external host, outputting, by the combo IC, the at least one event data to the external host through a plurality of second channels different from the plurality of first channels, based on a second command and the address received from the external host.

* * * * *